United States Patent
Bhagavatula et al.

(10) Patent No.: US 8,790,483 B2
(45) Date of Patent: Jul. 29, 2014

(54) METHOD OF WELDBONDING AND A DEVICE COMPRISING WELDBONDED COMPONENTS

(75) Inventors: Venkata Adiseshaiah Bhagavatula, Big Flats, NY (US); Roy Joseph Bourcier, Corning, NY (US); Satish Chandra Chaparala, Painted Post, NY (US); John Himmelreich, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 624 days.

(21) Appl. No.: 12/276,786

(22) Filed: Nov. 24, 2008

(65) Prior Publication Data

US 2010/0129647 A1    May 27, 2010

(51) Int. Cl.
  *B29C 65/16*   (2006.01)
  *G02B 6/255*   (2006.01)
  *G02B 6/26*    (2006.01)

(52) U.S. Cl.
  USPC .......................... 156/272.8; 385/15

(58) Field of Classification Search
  USPC ............. 156/379.8, 272.2, 272.8; 385/15
  See application file for complete search history.

(56) References Cited

U.S. PATENT DOCUMENTS

| | | | |
|---|---|---|---|
| 4,424,435 A * | 1/1984 | Barnes, Jr. | 219/121.64 |
| 4,714,315 A * | 12/1987 | Krause | 385/96 |
| 6,103,988 A | 8/2000 | Kim | 219/121.63 |
| 6,932,879 B2 | 8/2005 | Ely et al. | 156/87 |
| 2002/0158051 A1 | 10/2002 | Heitel et al. | 219/121.63 |
| 2006/0215964 A1 * | 9/2006 | Kuroda et al. | 385/49 |
| 2006/0237402 A1 * | 10/2006 | Nagashima et al. | 219/121.63 |
| 2007/0040002 A1 | 2/2007 | Talwar | 228/101 |
| 2008/0128394 A1 | 6/2008 | Wang et al. | 219/117.1 |

FOREIGN PATENT DOCUMENTS

| | | | | |
|---|---|---|---|---|
| CN | 1886687 A | | 12/2006 | |
| JP | 03116108 A | * | 5/1991 | |
| JP | 05196836 A | * | 8/1993 | ............ G02B 6/30 |
| JP | 09243845 A | * | 9/1997 | ............ G02B 6/126 |
| JP | 10197749 A | * | 7/1998 | ............ G02B 6/30 |
| JP | 2004-90030 | | 9/2002 | |
| JP | 2008-23550 | | 7/2006 | |

OTHER PUBLICATIONS

JP 03116108 A English Abstract.*
JP 05196836 A English Abstract, Aug. 1993.*
JP 09243845 A English Abstract, Sep. 1997.*
JP 10197749 A English Abstract, Jul. 1998.*
JP 03116108 A English Abstract, May 1991.*
CN1886687A/Machine Translation, Dec. 27, 2006.

* cited by examiner

*Primary Examiner* — Richard Crispino
*Assistant Examiner* — Elizabeth Royston
(74) *Attorney, Agent, or Firm* — Svetlana Z. Short; Gregory V. Bean

(57) ABSTRACT

A method of assembling optoelectronic and/or photonic components, said method comprising: (i) providing at least two optoelectronic and/or photonic components; (ii) aligning and situating these components relative to one another and in close proximity with one another so as to: (a) provide optical coupling between these components; and (b) maintain the distance d between the adjacent parts of these components, where d is 0 to 100 μm; (iii) adhering these components to one another with while maintaining optical coupling therebetween; and (iv) laser welding these components together while maintaining optical coupling therebetween.

18 Claims, 9 Drawing Sheets

METHOD OF WELDBONDING AND A DEVICE COMPRISING WELDBONDED COMPONENTS

BACKGROUND OF THE INVENTION

1. Field of the Invention

The present invention relates generally to an improved method of weldbonding, and more particularly to a method of weldbonding photonic or electro-optical components, and to devices comprising such weldbonded components.

2. Technical Background

With rapidly increasing demand for photonic or opto-electronic devices (for example lasers or LED based portable or embedded projectors), one of the biggest challenges in assembling these devices is connecting or joining various components to one another to provide high optical coupling efficiency between these components, and maintaining the performance of the assembled device stable over time and during temperature variations.

Laser welding has been used in a variety of applications in the assembly of photonic components. During welding, the rapid solidification of the welded parts and the associated material shrinkage can lead to a relative movement between the pre-aligned components (process induced misalignment). This is also referred to as Post Weld Shift (PWS). The optical output power and/or optical coupling efficiency between welded photonic or opto-electronic components may be significantly reduced by PWS.

The use of combined adhesive bonding and welding has been considered previously for aero and auto applications. In these applications, large area metal sheets are glued and welded to provide structural/strength characteristics. This process is referred to as weldbonding. The adhesive is sandwiched between the metal sheets and the welding is performed subsequently through the sheets. The welding provides the benefits of instant strength and high peel resistance, whereas the adhesive bonding provides fatigue and vibration resistance and improved strength and durability. The focus is on large area bonding and structural requirements, not on high precision alignment, or optical coupling between components. Thus, to our knowledge, the weldbonding art does not address prevention of movement at the submicron level of the bonded parts during the welding process.

SUMMARY OF THE INVENTION

According to one aspect of the invention a method of assembling optoelectronic and/or photonic components, said method comprising: (i) providing at least two optoelectronic and/or photonic components; (ii) aligning and situating these optoelectronic and/or photonic components relative to one another and in close proximity with one another so as to: (a) provide optical coupling between these components; and (b) maintain the distance d between the adjacent parts of said components, where $0\ \mu m \leq d \leq 100\ \mu m$; (iii) adhering said components to one another with adhesive by situating adhesive at a boundary between these components and curing or solidifying the adhesive while maintaining optical coupling therebetween; and (iv) laser welding said components together. According to at least some embodiments the laser welding is performed at the boundary line between the two components. Preferably, the step of laser welding creates at least one welding spot (i.e., weld bead) about 50 μm to 1 mm in diameter.

Preferably, the laser welding step produces less than 1 μm shift, and more preferably less than 0.5 μm shift in the relative positions of the adjacent components.

Preferably the adhesive is characterized by modulus of rigidity in the range of $5\ GPa \leq R \leq 100\ GPa$, and a cure time between 1 sec and 90 sec. Preferably the adhesive's contraction (i.e., linear shrinkage during curing) is less than 1 μm during curing or solidification. For example, in some embodiments, the thickness of the epoxy bond shrunk by less than 10%, and in some embodiments by less than 5%, and in some embodiments by less than 1%. Preferably the adhesive is selected from the UV or heat curable epoxies such as acrylates to facilitate quick curing process and easy assembly process.

According to another embodiment of the present invention a device comprises: (i) at least two components situated proximate to one another, each of the two components including at least one optical element (i.e., optical, electro-optical or photonic element); (ii) at least one optical element of at least one of the at least two components being optically coupled to at least one optical element of another one of the at least two components; and (iii) at least one welding spot, and at least one spot of adhesive being situated at a periphery of the boundary formed between the two components.

Advantageously, the method of assembling optical, optoelectronic or photonic components into a package, according to the embodiments of the present invention provides high yields, can be done at a relatively low cost, and produces minimal (or no) post weld shift(s) of these components.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

DETAILED DESCRIPTION OF THE PREFERRED EMBODIMENTS

Figure 1A:
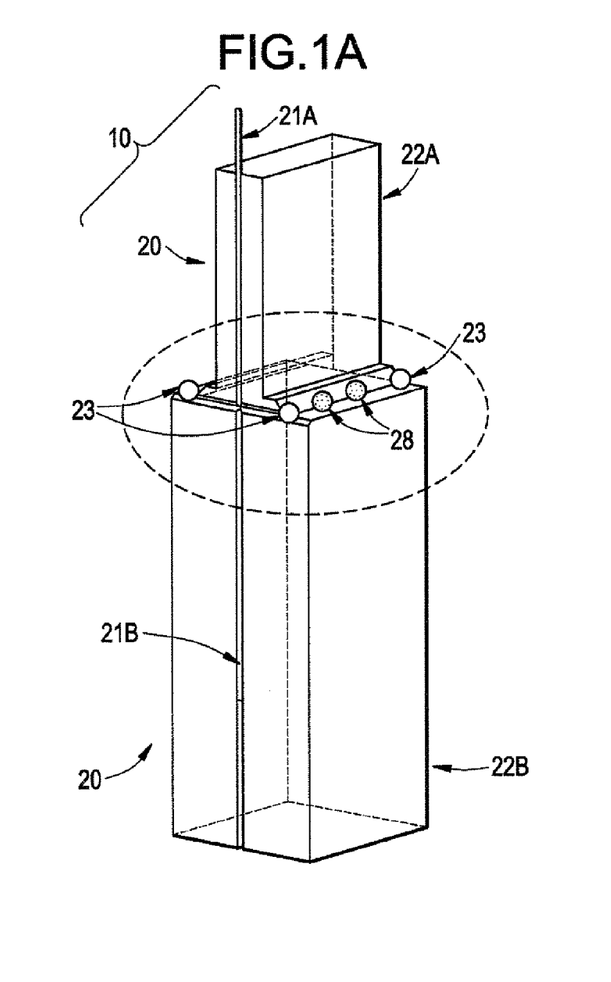
FIGS. 1A and 1B are schematic depictions of one embodiment of the present invention.
Figure 1B:
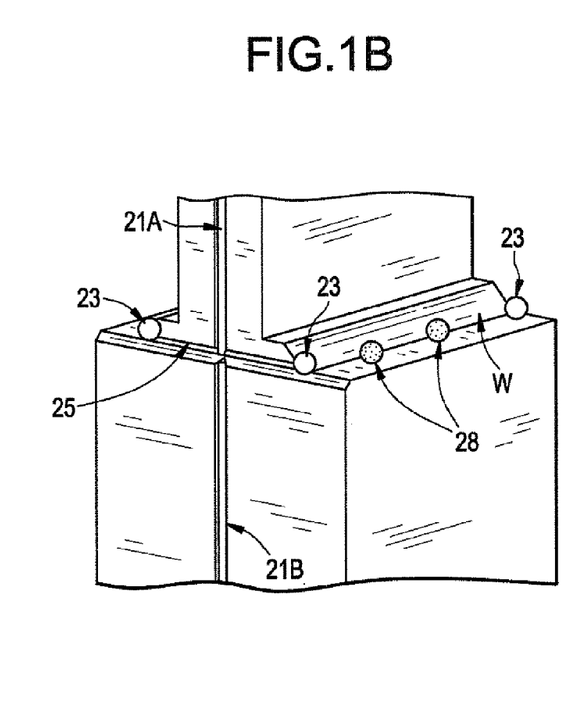
Figure 2A:
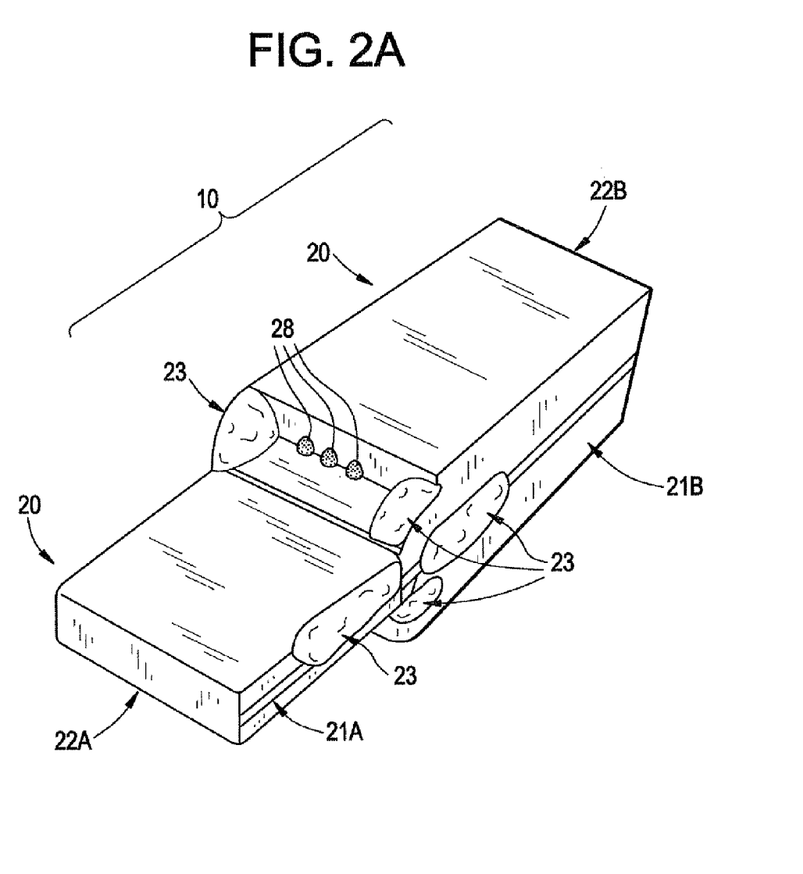
FIGS. 2A and 2B are photographs of one embodiment of the present invention.
Figure 2B:
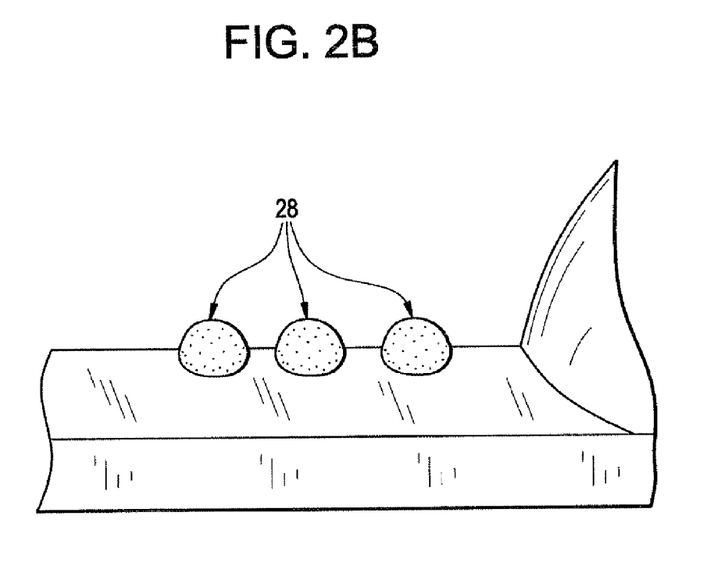

Reference will now be made in detail to the present preferred embodiments of the invention, examples of which are illustrated in the accompanying drawings. Whenever possible, the same reference numerals will be used throughout the drawings to refer to the same or like parts. One embodiment of the device of the present invention is shown schematically in FIG. 1, and is designated generally throughout by the reference numeral 10. FIG. 2A is a photograph of an exemplary built device, and FIG. 2B illustrates an enlarged area of the device 10 shown in FIG. 2A. The device 10 includes: (i) at least two components 20 (e.g., optoelectronic and/or photonic components) situated proximate to one another, each of these components including at least one optical, photonic, or optoelectronic element 21 (which are referred to herein as an optical element 21); (ii) at least one spot of adhesive 23 (adhesive bead) situated at a periphery of the boundary 25 formed between the two components (iii) and at least one welding spot 28 situated at a periphery of the interface or boundary 25 formed between the two components. The optical element 21 of at least one of these two components is optically coupled to at least one optical element 21 of the other component. Although the two optical elements 21 are optically coupled to one another, they may or may not be in physical contact with one another. Some examples of optical elements 21 are: waveguides (fiber or planar), lenses, lensed fibers, optical gratings, optical filters, optical couplers, optical or opto-electronic switches, optical frequency doubling crystals, laser diodes, and/or optical isolators. Preferably the adhesive 23 is characterized by modulus of rigidity in the range of 5 GPa≤R≤100 GPa, and rapid curing rate (e.g., between 1 sec and 90 sec). Preferably the adhesive's contraction (i.e., linear shrinkage during curing) is less than 1 μm during curing or solidification. For example, in some embodiments, the thickness of the epoxy bond shrunk by less than 10%, and in some embodiments by less than 5%, and in some embodiments by less than 1%.

In accordance with some embodiments of the present invention, a method of assembling optoelectronic and/or photonic components 20 (also referred to as components herein), comprises the steps of: (i) providing at least two optoelectronic and/or photonic components 20; (ii) aligning and situating the components 20 relative to one another and in close proximity with one another so as to: (a) provide optical coupling between these components; and (b) maintain the distance d between the adjacent parts of these components, where d is 0 (components are in physical contact with one another) to 100 μm; (iii) adhering or joining the two components to one another with an adhesive 23 (e.g., UV or temperature curable epoxy) by: (a) situating the adhesive 23 at a boundary 25 between components 20, such that the two components are in physical contact with the adhesive 23 and (b) curing or solidifying the adhesive 23 while maintaining the optical coupling between these components; and (iv) laser welding the components together at the boundary 25 (e.g., along the periphery of the boundary) to produce the assembled device 10. The laser welding creates welding spot(s) 28, for example of 50 μm to 1 mm in cross-section (e.g., 200 μm to 600 μm in diameter). Preferably a plurality of welding spots 28 (also referred herein as weld spots) are created during the laser welding part of the process. If the adhesive requires UV curing, (for example a UV curable epoxy) the step of adhering the two components to one another with the adhesive 23 includes the step of UV curing the adhesive 23 to create a permanent bond between these components 20. The optical alignment and/or optical coupling is maintained during laser welding by the structural rigidity of the (solidified or cured) adhesive 23. As used herein, the term "optical coupling" means that the two components are aligned such that if (or when) light is provided to an optical element of one of the two components (e.g., first component), the light will enter into the optical element of the other component and will then exit from the optical element of this other component. Thus, the two components or two optical elements may be optically coupled to one another even when the light is not provided to an optical element of one of the two components (e.g., to the first component), because they are positioned and aligned such that the if light is provided, it will couple from one of the elements to the other element. Advantageously, the laser welding step produces less than 1 μm shift in position of either one of the two welded components. Preferably, the two components 20 shift by no more than 1 μm relative to one another. Such small shifts do not significantly interfere with optical coupling efficiency E or with optical output power P, which (assuming that the input optical power is maintained at the same level) is preferably maintained within 20% and even more preferably within 10%, i.e., $P_2 \geq 0.8P_1$ and more preferably $P_2 \geq 0.9P_1$ where $P_1$ is the optical power throughput before the laser welding step and $P_2$ is to the optical power throughput after laser welding. Even more preferably, $P_2 \geq 0.95P_1$. This power change relates to the post-weld shift and depends on the relative shifts between the aligned optical elements and their optical beam characteristics. In many optical, photonic or opto-electronic devices of interest (for example, Laser Diodes and single mode waveguides) the beam diameters are in the range of about 1 μm to about 10 μm, and it is preferable to limit the PWS to submicron levels to get less than 20%, and more preferably less than 10% relative change from $P_1$ to $P_2$. The optical coupling efficiency E is also maintained within 20%, preferably within 10%. And more preferably within 5%. (E=Pout/Pin), where Pin is an input optical power provided to an optical element of one of the two components, and Pout is an output optical power provided by an optical element of the other component.). Thus, it is preferable that $E_2 \geq 0.8E_1$ and more preferably $E_2 \geq 0.9E_1$ where $E_1$ is the optical coupling efficiency before the laser welding step and $E_2$ is to the optical coupling efficiency after laser welding. Even more preferably, $E_2 \geq 0.95E_1$.

According to some embodiments, the adhesive is an epoxy, and the step of adhering the two (or more) components to each other includes a step of changing rigidity of the epoxy 23 to create a permanent bond between the two adjacent components 20. This can be done, for example, by UV curing the applied adhesive 23 to make it rigid, attaching it to both components. The adhesive 23 may be a heat curable adhesive, which is applied in a liquid form, and solidifies when exposed to heat. Alternatively an adhesive 23 may be applied as a hot liquid which then solidifies (becomes more rigid) when exposed to a room temperature. Preferably, the adhesive changes its rigidity (solidifies or cures) within a few seconds (e.g., 1 sec to 90 sec, 1 sec to 60 sec, or 5 sec to 45 sec) after its application, thus bonding the two components together while maintaining their alignment within the desired level.

According to some embodiments the method also includes steps of: (i) measuring optical output power or optical coupling efficiency between components 20 prior to joining them one to another with said epoxy; and (ii) measuring optical output power or optical coupling efficiency between components 20 while adhering them one to another with epoxy 23. According to some embodiments the method also includes steps of: (i) measuring optical output power or optical coupling efficiency between components 20 prior to joining them one to another with said epoxy; and (ii) measuring optical output power or optical coupling efficiency between components 20 while measuring optical output power, or coupling efficiency between these components while laser welding them one to another.

The optical coupling efficiency is defined as the ratio between output optical power (Pout) out of the optical element of the other component 20, and input optical power (Pin) out of the optical element of the other component 20 (i.e., E=Pout/Pin), where the two optical elements are optically coupled to one another. Thus, the coupling efficiency $E_1$ between the two components 20 prior to joining them one to another with the adhesive 23 is $E_1=P_1/Pin$. Similarly, coupling efficiency Ec between said components while curing or solidifying the adhesive 23 is $E_c=Pc/Pin$. Similarly, coupling efficiency $E_2$ between these components while laser welding them one to another is $E_2=P_2/Pin$.

For example, according to some embodiments the method also includes the steps of (i) measuring optical output power $P_1$, or coupling efficiency $E_1$ between the two components 20 prior to joining them one to another with the adhesive 23; (ii) measuring optical output power Pa, or coupling efficiency Ea between these components while adhering them one to another with the adhesive 23; (iii) measuring optical output power $P_c$, or coupling efficiency Ec between said components while curing or solidifying the adhesive 23; (iv) measuring optical output power $P_2$, or coupling efficiency $E_2$ between these components while laser welding them one to another.

Preferably the method of assembling optoelectronic and/or photonic components 20 further includes steps of: (i) measuring optical output power $P_1$ or the optical coupling efficiency $E_1$ between the two components 20 prior to adhering or bonding them together with the adhesive 23; and (ii) utilizing the mechanical strength and rigidity of the adhesive bond to maintain optical output power $P_2$, or the optical coupling efficiency $E_2$ between the two components 20 while laser welding the two components to each other such that: (a) the optical output power after welding is $P_2 \geq 0.8P_1$, and preferably $P_2 \geq 0.9P_1$; and/or optical coupling efficiency $E_2 \geq 0.8E_1$, and preferably $E_2 \geq 0.9E_1$ Preferably, $P_2 \geq 0.95P_1$, more preferably $P_2 \geq 0.97P_1$. Preferably, $E_2 \geq 0.95E_1$, more preferably $E_2 \geq 0.97E_1$.

According to some embodiments, laser welding is performed utilizing a Nd:YAG laser with a wavelength of 1064 nm operated at 0.5 J to 2.5 J per weld spot, using a pulse width of 1 to 5 milliseconds, with a laser spot diameter of 250 μm to 1 mm (e.g., 450 μm). However, laser welding can be performed with other lasers, for example a $CO_2$ laser with a wavelength of 10,600 nm, a frequency-doubled YAG with a wavelength of 532 nm, a 810 nm laser, or an IR laser operating in the 1.3 μm to 1.5 μm wavelength range.

The optical components 20 may be made of materials which can be joined using laser welding, including metal (e.g., steel or aluminum substrates), metal-ceramic composite material, glass-ceramic material, glass or polymer materials. For example, the adhesive 23 may be utilized to create bond between two metal components, a metal component and a metal-ceramic composite component, or two glass components. Laser welding is then subsequently performed to weld the two bonded components together. For example, two glass components can be laser welded to one another after they have been adhered to one another so that the desired alignment is maintained during and after laser welding.

Beneficially, one advantage of the method according to the present invention is that it results in sub-micron shift between the two welded components 20, creating only minimal change in optical coupling efficiency between the welded components.

Thus, the method of weldbonding described herein advantageously prevents movement of the bonded parts during the welding process (any residual movement can be held at the submicron level), which is especially advantageous for optoelectronic or photonic applications.

More specifically, the adhesive bond provides the rigidity to oppose stresses that would misalign the optoelectronic subassemblies (components 20) during the subsequent laser welding process. In order to prevent movement of the bonded parts relative to one another during the welding process, the adhesive needs to have (1) rigidity R to counter the forces of laser welding, where preferably R>1 GPa, more preferably R>5 GPA, for example 10 GPa≤R≤50 GPa, 15 GPa≤R≤30 GPa, or 18 GPa≤R≤25 GPa; (2) negligible/low contraction (shrinkage) C during curing to maintain the sub-micron alignment during the initial epoxy tacking of the opto-electronic sub-assemblies, wherein C<1 μm (preferably C<0.5 μm), and (3) rapid curing for low cost manufacturing. For example, in some embodiments, the thickness of the epoxy bond shrunk by less than 10%, and in some embodiments by less than 5%. Thus, for example, if the original epoxy bead thickness was 20 μm, after curing the epoxy bond thickness was not less than 19 μm, which means that the epoxy thickness was reduced by less than 5%. Preferably the curing time should be less than 90 sec, more preferably no more than 60 sec (e.g., 10-60 sec), and even more preferably less than 10 sec. Examples of epoxies that can be used for this application include, but are not limited to, the "Optocast" brand of filled epoxies (available, for example, from Electronic Materials Inc. of Breckenridge, Colo.). This brand of epoxy is a UV and/or heat curable one component epoxy with silica filler material. Non-filled epoxy can also be used for this purpose as long as the rigidity, cure time and contraction requirements are met. Such materials include, for example, "Lens Bond" UV curable epoxies (available from Summers Optical Inc. of Hatfield, Pa.). These epoxies come in different viscosity ranges. For example, in order to facilitate very thin bond lines or spots for the adhesives, low viscosity adhesives with viscosity values in the range of 50-500 centipoise can be utilized. These adhesives are preferable when the distance between two components needs to be small, for example d≤5 μm. The low viscosity adhesives can spread into the gap between the two components, providing more surface contact. However if the low viscosity adhesive is a UV curable adhesive, and spreads between the two components, it would be hard to completely cure such adhesive, unless the components are transparent. Furthermore, care has to be taken to not allow such adhesives to contaminate optical element(s) or to interfere with optical coupling by spreading into the optical path. Thus, high viscosity adhesives, particularly filled epoxies with low shrinkage, may be preferable, because these adhesives are less likely to spread into the optical path, and less likely to contaminate optical elements. The high viscosity adhesives may have viscosity values in the range of 500 to 100000 centipoise. In the following examples we have chosen to use adhesives of high viscosity and applied these adhesives on outside of the interface (or boundary) between the two components. High viscosity adhesives may require to be applied in relatively large bead sizes to provide more surface contact. The bead diameters, or bead widths for high viscosity adhesives in the following examples are 1 mm to 3 mm, but may be different, based on the required application.

EXAMPLES

The invention will be further clarified by the following examples.

Example 1

According to one exemplary embodiment, two photonic components 20 were assembled together to create a permanent bond therebetween. (See FIGS. 1, 2A and 2B). More specifically, an optical element 21A (in this example, an optical fiber) was mounted on a metal substrate 22A, (in this example stainless steel 304 substrate) and glued to the substrate, forming a first photonic component 20. Another photonic component 20 was made by mounting an optical fiber 21B on another substrate 22B. Note that there is a wedge W on one of the mating surfaces 20A of the first component 20. The two photonic components 20 were situated in close proximity to one another such that when light was provided to the input end A of optical fiber waveguide 21A, the light exited from the output end B of optical fiber waveguide 21B. The two photonic components 20 were aligned for peak coupling (coupling that produces a maximum output power measured at the exit end B of the optical fiber waveguide 21B) band; and then glued in place using UV curable adhesive (e.g., OPTO-CAST™ 3415, available from Electronic Materials, Inc., Breckenridge, Colo.) forming a "T" joint. Laser welding was subsequently performed on the glued assembly. In this exemplary embodiment we utilized a pulsed Nd:YAG laser operated with a pulse width of 3 milliseconds, depositing an energy of approximately 0.9 J per weld spot. In this exemplary embodiment, the weld spot diameters d were approximately 450 microns. (See FIGS. 1 and 2A, 2B for the welding spot locations.)

The adhesive placement should be such that adhesive does not interfere with subsequent laser welding. In choosing the placement of the adhesive 23, one should preferably take into account the symmetry of the device design, such that any contraction of the adhesive 23 would generate nearly equal and opposing forces that cancel each other and minimize the relative shift between components 20. For example, it may be preferable that adhesive beads be placed equidistantly from a component's center, or symmetrically around the perimeter of the smaller component. In this exemplary embodiment the adhesive is a high viscosity adhesive, and it is applied on outside the interface between the components, in order to avoid possible wicking between components. Thus, is preferable to utilize adhesives with viscosities greater than 5000 centipoise, and more preferably greater than 50,000 centipoise (Cps). For example, Opticast 3415 has a viscosity value of 100,000 Cps. The weld positions are also preferably selected for symmetry and the production of counter balancing forces. The laser pulse energy is preferably chosen such that each pulse produces a residual force small enough to be easily withstood by the rigid epoxy. Multiple weld spots are used to provide enough strength and reliability under operating conditions.

Figure 4A:
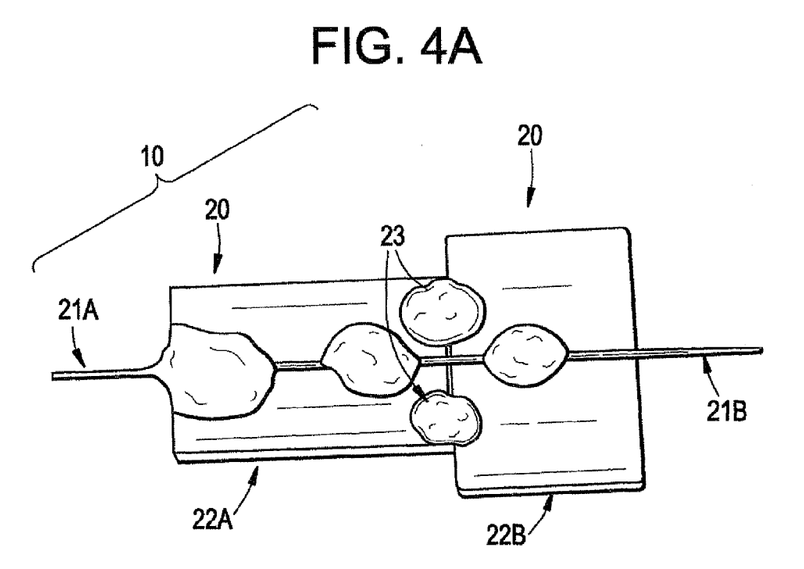
FIGS. 4A and 4B are photographs of another embodiment of the present invention.
Figure 4B:
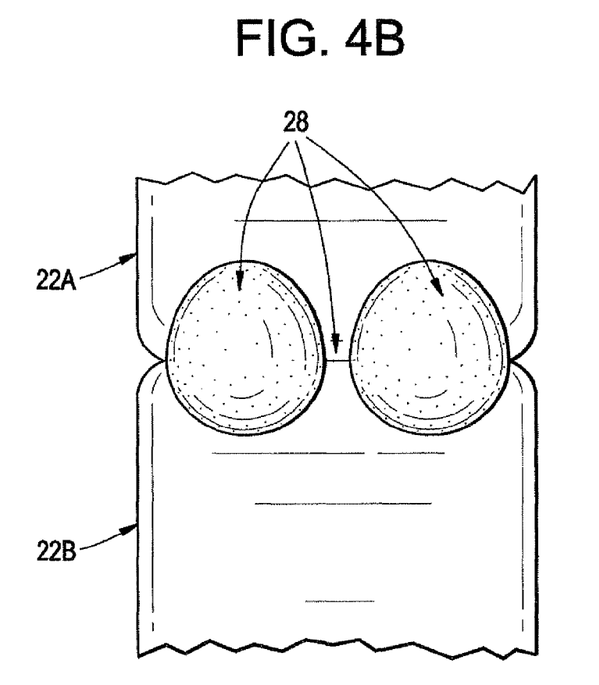
Figure 5:
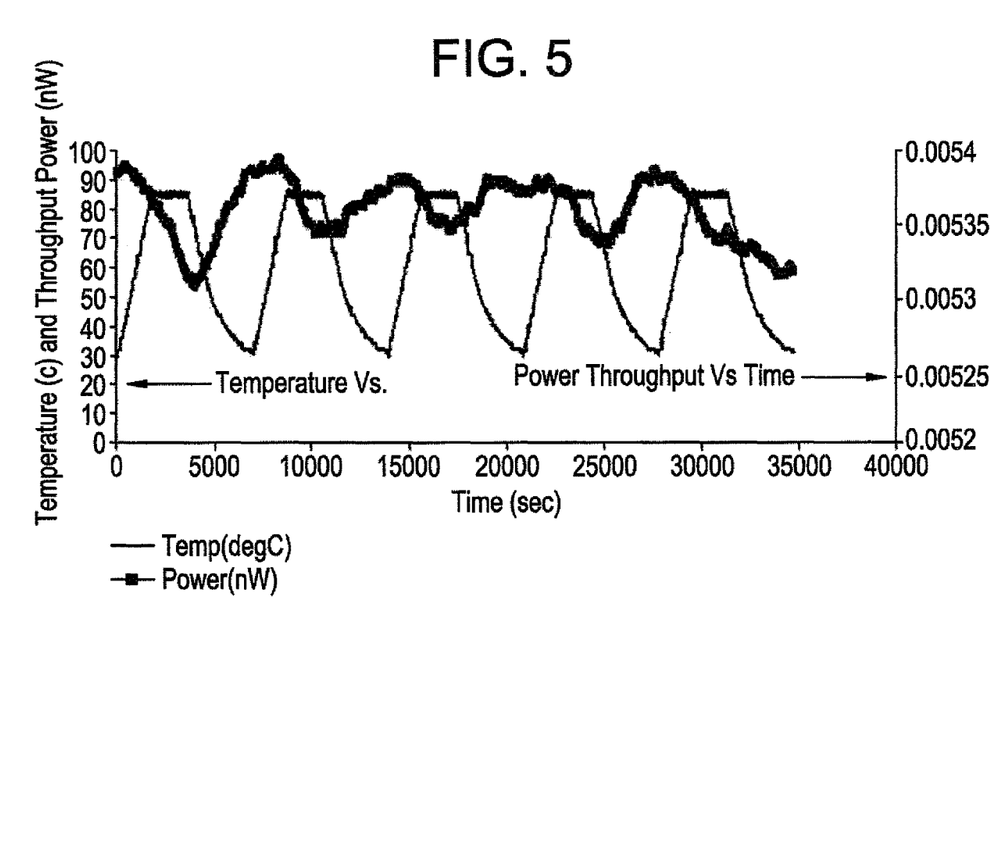
FIG. 5 is a graph showing temperature fluctuation and output power fluctuation as a function of time, for a device of FIG. 4A.
Figure 6:
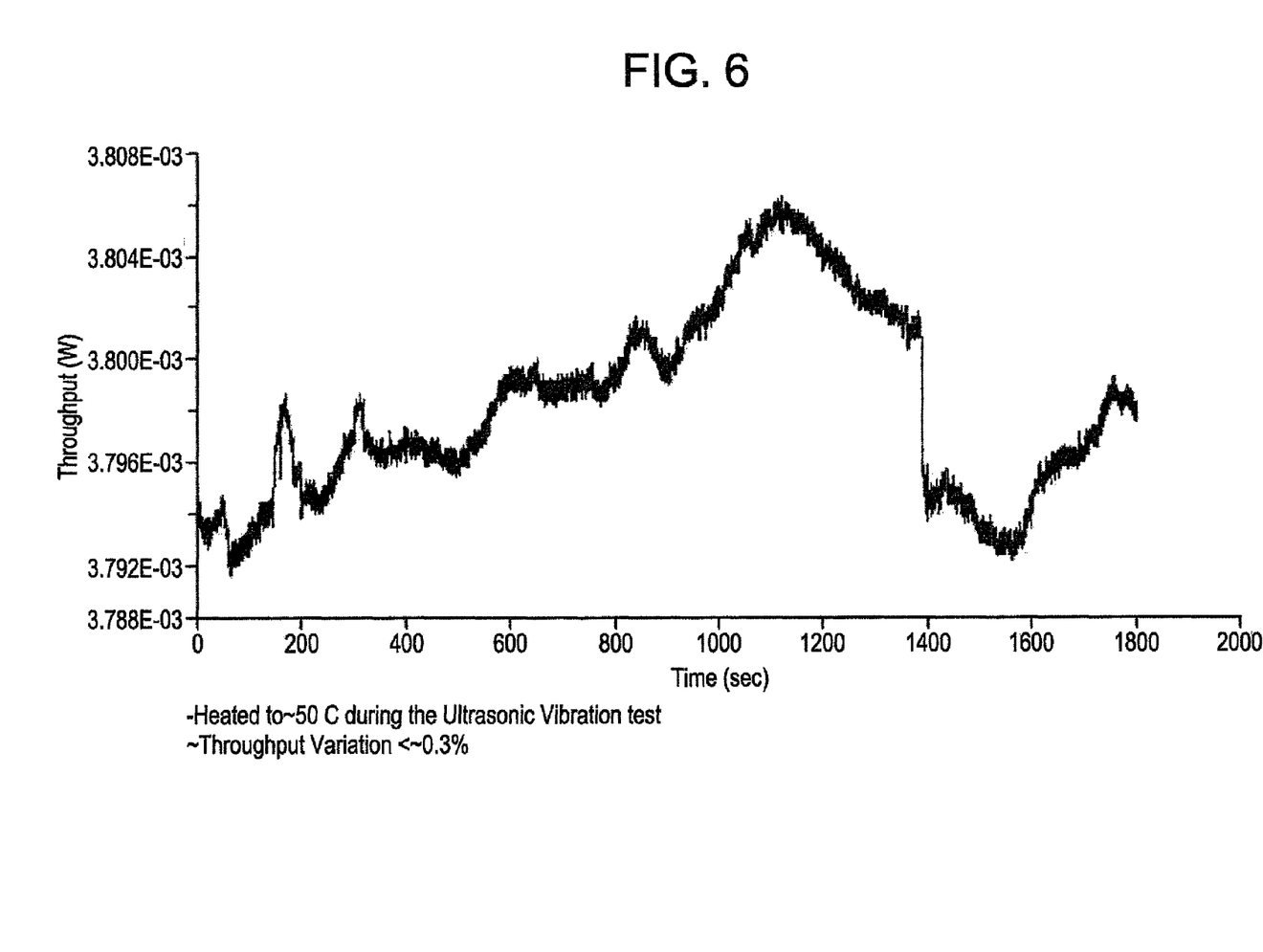
FIG. 6 is a graph showing output power fluctuation during ultrasonic vibration, as a function of time.

In this exemplary embodiment we measured optical coupling efficiency (optical output power) before and after the welding step. We had found that the joined components 20 had excellent coupling stability after the welding step. The change in the output power measured as a result of post weld shift was less than 1% (i.e., $P_2 > 0.99 P_1$). In the initial experiment, the metal substrate thickness was 6 millimeters. Later, the substrate thickness was modified to 1.5 millimeters and the experiment was repeated. The change in the output power measured as a result of post weld shift in thinner assemblies was less than 3% (i.e., $P_2 > 0.97 P_1$). Later, both of these assemblies (devices 10) were subjected to thermal cycling testing over temperature ranges from about 20° C. to about 85° C. The optical output power variation during the thermal cycling was less than 3% (i.e., $P_2$ changed by less than 3%), thus demonstrating excellent athermal behavior of the device 10. We then subjected both assemblies (devices 10) to ultrasonic vibration with heat (50° C.) and 100% humidity (ultrasonic bath environment). Both devices 10 demonstrated 0.3% output power variation. More specifically, FIG. 5 shows the athermal behavior of the completed assembly shown in FIG. 4. FIG. 6 illustrates assembly performance under heat, humidity and vibration conditions.

Example 2

Figure 3A:
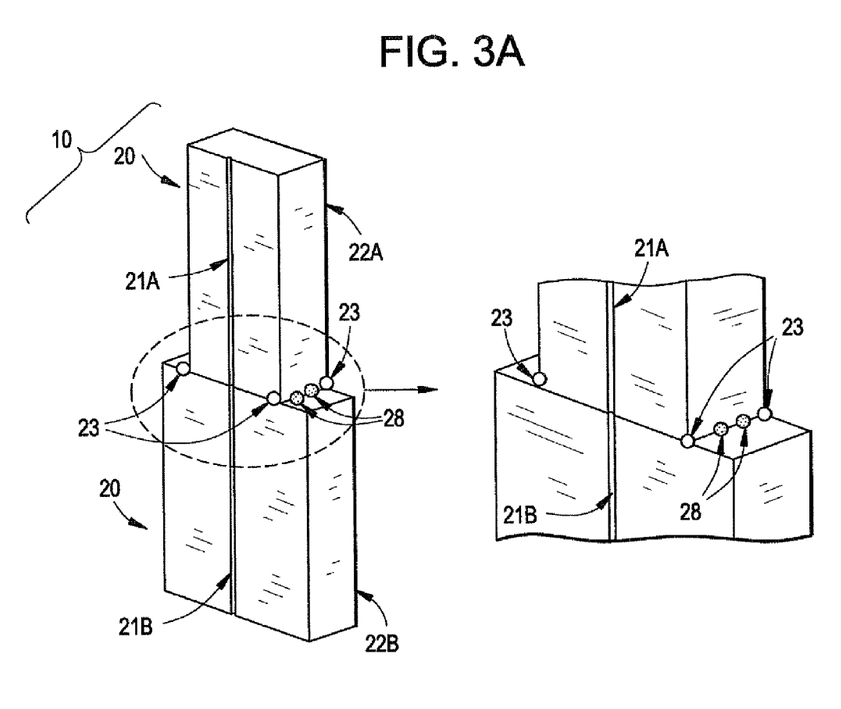
FIG. 3A is another schematic depiction of one embodiment of the present invention.

The method of aligning components and gluing them in place and performing laser welding can extended to different mating surface geometries. In the above Example 1, the face of one of the mating surfaces has a wedge. In this example, the surface is changed such that there is no wedge and the whole assembly looks like a "T" joint. (See FIG. 3 for the schematic drawing and FIGS. 4A and 4B for a photograph of the manufactured device 10). More specifically, FIG. 4A illustrates a top view of the device 10 and FIG. 4B illustrates a portion of the side view of the manufactured device 10 of FIG. 4A. The average post-weld shift induced throughput power variation was about 1.8% (i.e., $P_2 > 0.982 P_1$, including source fluctuations. In this exemplary embodiment, thermal cycling of the manufactured device 10 resulted in less than 2% variation (i.e., $P_2$ varied by less than 2%). This type of "T joint" geometry is preferred because each component 20 can be a simple rectangular block. Another advantage with such T-Junction component assemblies is that, even with manufacturing variations in sizes and tolerances, the weld joints will be symmetric and thus apply opposed transverse weld forces. That is, with balanced laser beam powers and placements, the resulting symmetric weld locations (weld spot locations) apply equal and opposite forces and to a large extent cancel each other, and the remaining forces that need to be compensated by the rigid epoxy bond are reduced.

Also, a preferred laser welding approach would involve using multiple smaller pulses, which results in smaller welding spot sizes. Smaller welding spots generally involve smaller forces that are easier to counteract. Also, multiple welded areas would provide redundancy during operation and hence would lead to more reliable and durable devices. In this exemplary embodiment, the laser beam welds were made in the center of the T-junction using two balanced laser beams, because this laser weld configuration provides the most symmetry in this exemplary device 10. Similar factors (e.g., device geometry, adhesive placement location, location and number of weld spots) have to be taken into account for other device geometries when weldbonding together optical, photonic or electro-optical components 20.

The excellent stability (e.g., small PWS values, and good optical coupling under different environmental conditions) obtained using this method of assembly is believed to be primarily due to the counter-force provided by the adhesive 23 to oppose the motions caused by the rapid solidification of the molten material (e.g., metal, glass and/or glass ceramic). Another cause could be the lever arm effect. The weld plane almost coincides with the plane of two waveguides (the distance between the two waveguides 21A, 21B of this embodiment is less than 5 microns). During cooling of the welding spots 28, there could be rotational motions of the sub-assemblies (optical components 20) which could result in the translation of the waveguides 21A, 21B relative to one another. If the weld plane was far removed from the optical coupling plane, large lateral displacements could occur on the optical coupling plane which would greatly reduce coupling efficiency. But, in the examples described herein, the welding and optical coupling planes are nearly coincident, and thus the translations would be insignificant because the lever arm is small. Thus, it is preferable, to have weld plane coincide or nearly coincide (i.e., preferably within 1 mm) with the plane that the optical elements are situated on.

Although in the second example the two components 20 were in physical contact with one another, this method was also shown to work when there was an approximately 30 microns gap (d=30 µm) between the two mating surfaces of the two components, with similar post weld shift performance.

Example 3

Figure 7:
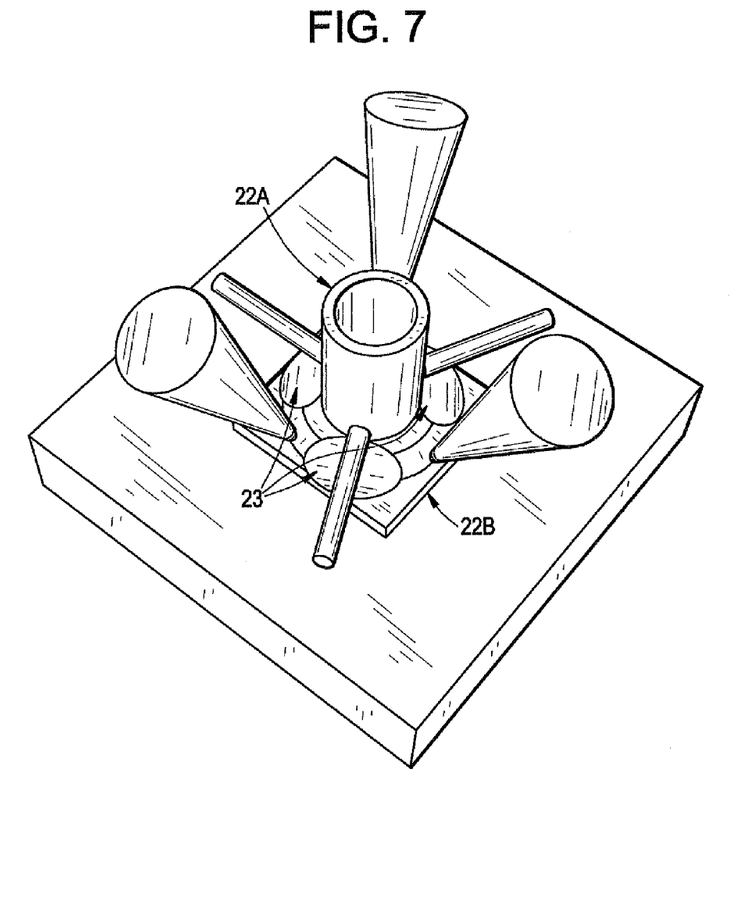
FIG. 7 is a schematic depiction of two components that are being weldbonded together.
Figure 8:
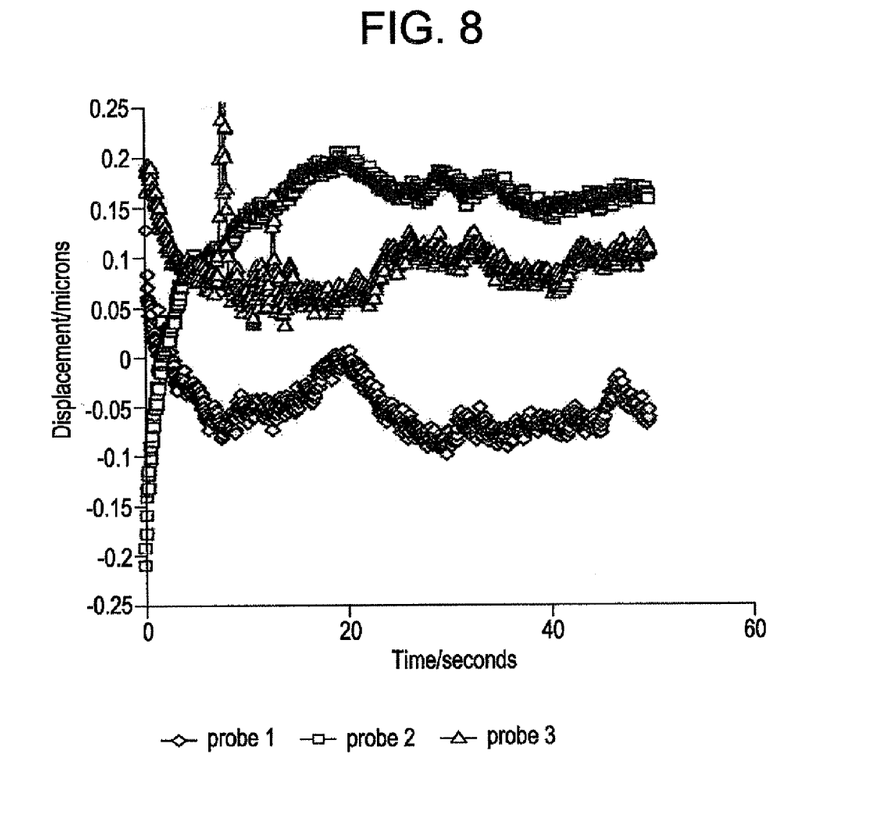
FIG. 8 shows the measured mechanical displacements of the axisymmetric surrogate test article schematically shown in FIG. 7.

The present method of device assembly can also be applied to axisymmetric devices. In this embodiment, stainless steel 304 device surrogates (i.e., components without optical elements) were assembled with adhesives: some device surrogates were bonded using three small beads of cyanoacrylate gel (such as Super Glue Gel®, The Original Super Glue Corporation, Rancho Cucamonga, Calif.) while the other surrogates were made using a filled two part epoxy (such as J-B Kwik®, J-B Weld Company, Sulphur Springs, Tex.). The cylindrically shaped metal substrate 22A (surrogate component 20) used in this example (see FIG. 7) were flanged, with a 45 degree taper and attached to the base surrogate component 20' (metal substrate 22A). The bonded device surrogates were clamped into our test fixturing and component displacements in each device surrogate were monitored using three Philtec RC20 fiber optic sensor displacement probes (Philtec, Annapolis, Md.). Other probes may also be utilized. The bonded device surrogates were welded with three beams oriented 120 degrees apart and inclined at 25 degrees from the ferrule centerline. The test configuration is illustrated schematically in FIG. 7. A relatively low power laser beam (in this example laser conditions were: 0.9 J per weld spot; 3 millisecond pulse width, and approximately 450 µm welding spot) was directed onto the interface between the two metal components. After the components have been welded together, the lateral post-weld shifts were measured. A typical test result from one of these device surrogates adhesively bonded using cyanoacrylate gel is shown in FIG. 8. This figure shows the measured mechanical displacements of the axisymmetric surrogate test device shown in FIG. 7. The three traces of FIG. 8 represent the output of the three displacement sensors. In FIG. 8 the y axis units are µm, and the x-axis represents time, measured in seconds.

Advantageously, the present method of weldbonding offers attractive features such as micron-level accuracy joining of optical components, stability over temperature, and long term device reliability. That is, because the weldbonding joint is capable of holding the components 20 with submicron precision.

Advantageously, the method of assembling opto-electronic or photonic components into a package, according to the embodiments of the present invention, utilizes a modified weldbonding processes that minimizes the post-weld shift to submicron levels, which makes this method suitable for assemblies of photonic or opto-electronic devices or packages.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method of assembling optoelectronic and/or photonic components, said method comprising:
  (i) providing at least two optoelectronic and/or photonic components;
  (ii) aligning and situating said optoelectronic and/or photonic components relative to one another and in close proximity with one another so as to: (a) provide optical coupling between said components which is enabled by an optical path between adjacent components; and (b) maintain the distance d between the adjacent parts of said components, where $0\ \mu m \le d \le 100\ \mu m$;
  (iii) adhering said components to one another with adhesive by (a) applying said adhesive at a periphery of a boundary between said components and not in the optical path between components, and (b) curing or solidifying said adhesive while maintaining optical coupling therebetween; and (iv) laser welding said components together while maintaining optical coupling therebetween.

2. The method of claim 1, wherein said laser welding step produces less than 1µ shift in position of either one of adjacent components and said optical coupling during laser welding is maintained, at least in part, through structural rigidity of said cured or solidified adhesive.

3. The method of claim 1, wherein said adhesive is an epoxy, and said step of adhering said components includes a step of changing rigidity of said epoxy to create a permanent bond between said components.

4. The method of claim 1, wherein said adhesive is a UV curable epoxy, and said step of adhering said components includes a step of UV curing said adhesive to create a permanent bond between said components.

5. The method of claim 1, wherein the adhesive is applied along the outer periphery of the boundary between said components.

6. The method of claim 1, wherein the said adhesive is characterized by modulus of rigidity of 5 GPa to 100 GPa, cure time of 1 sec to 90 sec, and contraction C of less than 1 µm during curing.

7. The method of claim 1, wherein the said adhesive is selected from a group consisting of: uv curable epoxy, heat curable epoxy, a thermoplastic adhesive, a thermosetting adhesive, a cyanoacrylate, a polyurethane, a silicone, or a polyimide.

8. The method of claim 1, wherein said step of laser welding creates at least one welding spot of 50 µm to 1 mm in diameter.

9. The method of claim 8, wherein each welding spot diameter is 200 µm-600 µm.

10. The method of claim 1, further including steps of (i) measuring optical output power or optical coupling efficiency between said components prior to joining them one to another with said epoxy; and (ii) measuring optical output power or optical coupling efficiency between said components while adhering them one to another with said epoxy.

11. The method of claim 1, further including steps of (i) measuring optical output power $P_1$, or optical coupling efficiency $E_1$ between said components prior to joining them one to another with said epoxy; and ii) maintaining, while laser welding said components to each other, (a) optical output power such that the output power after welding is $P_2 \ge 0.9 P_1$, or (b) optical coupling efficiency between said components, such that the optical coupling efficiency $E_2$ after welding is $E_2 \ge 0.9 E_1$.

12. The method of claim 11, wherein said welding is performed with a pulsed Nd:Yag laser.

13. The method of claim 11, wherein said welding is performed by welding with Nd:Yag laser operated at 0.5 J to 2.5 J per weld spot, using laser pulse width of 1 to 5 milliseconds with a laser spot diameter of 250 μm to 1 mm.

14. The method of claim 1, further including the steps of: (i) measuring optical output power $P_1$, or optical coupling efficiency $E_1$ between said components prior to joining them one to another with said adhesive; (ii) measuring optical output power Pa, or optical coupling efficiency Ea between said components while adjoining them one to another with said adhesive; (iii) measuring optical output power Pc, or optical coupling efficiency Ec between said components while curing or solidifying said adhesive; (iv) measuring optical output power $P_w$, or optical coupling efficiency $E_w$ coupling efficiency between said components while laser welding them one to another.

15. The method of claim 1, wherein said welding is by welding with Nd:Yag laser operated at 0.5 J to 2.5 J per weld spot, using laser pulse width of 1 to 5 milliseconds with a laser spot diameter of 250 μm to 1 mm.

16. The method of claim 1, wherein the adhesive is at least partially opaque.

17. A method of assembling optoelectronic and/or photonic components, said method comprising: (i) providing at least two optoelectronic and/or photonic components; (ii) aligning and situating said optoelectronic and/or photonic components relative to one another and in close proximity with one another so as to: (a) provide optical coupling between said components which is enabled by an optical path between adjacent components; and (b) maintain the distance d between the adjacent parts of said components, where d is 0 to 1000 μm: (iii) adhering said components to one another with adhesive by applying adhesive at a periphery of a boundary between said components and not in the optical path between components while maintaining said optical coupling; and (iv) laser welding said components together at the boundary between said components.

18. The method of claim 17, wherein the adhesive is at least partially opaque.

* * * * *